A. DEISHER.
Harrow.
No. 219,229. Patented Sept. 2, 1879.
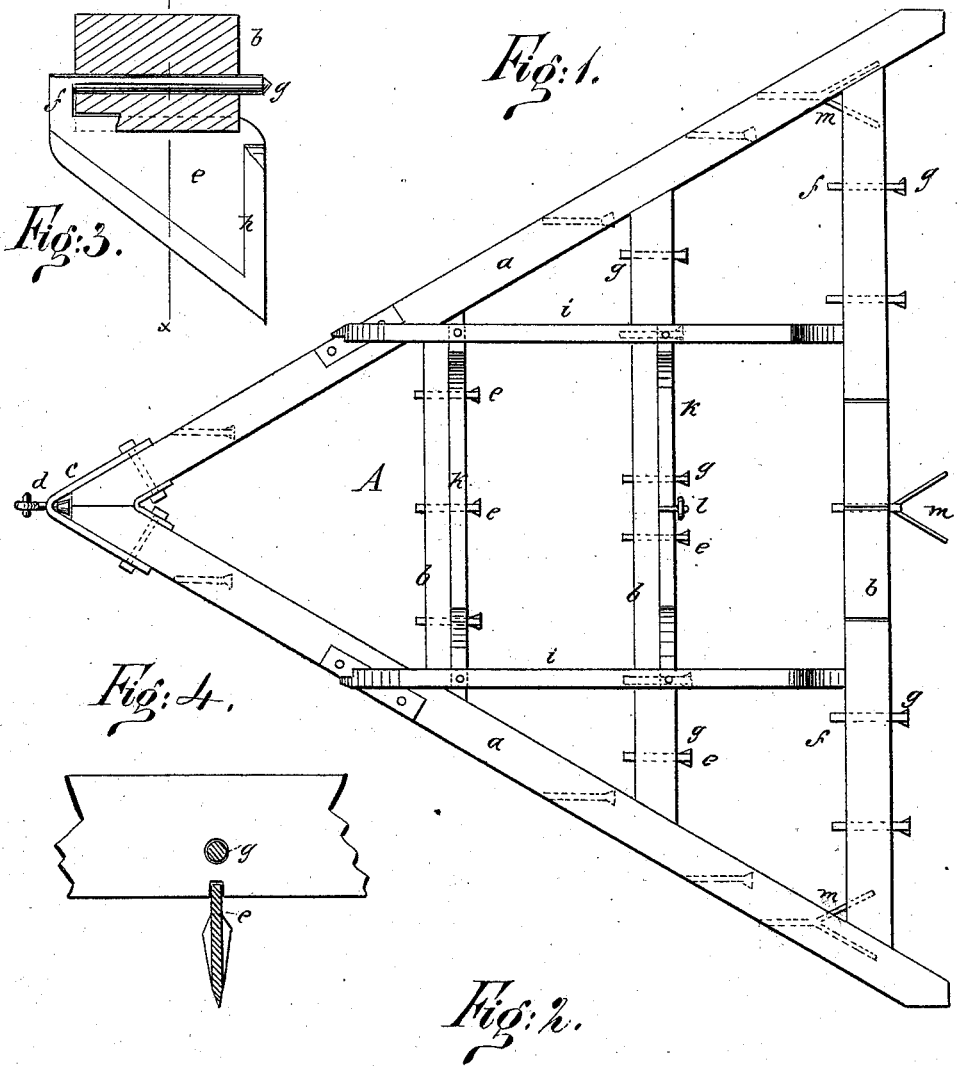
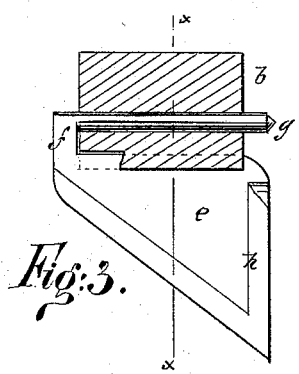
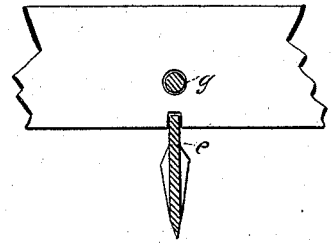
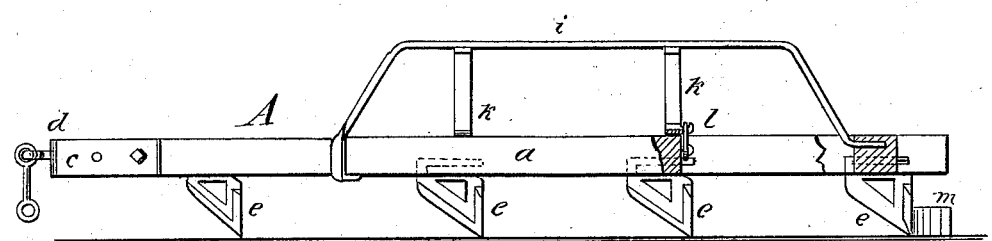

UNITED STATES PATENT OFFICE.

ALFRED DEISHER, OF FLEETWOOD, PENNSYLVANIA.

IMPROVEMENT IN HARROWS.

Specification forming part of Letters Patent No. 219,229, dated September 2, 1879; application filed June 23, 1879.

*To all whom it may concern:*

Be it known that I, ALFRED DEISHER, of Fleetwood, in the county of Berks and State of Pennsylvania, have invented a new and Improved Harrow, of which the following is a specification.

The invention consists in making harrow-teeth of plates with an inclined cutting-edge, wings, a shoulder, and pin, as hereinafter more particularly described.

Figure 1 of the drawings is a plan view of my improved harrow. Fig. 2 is a side elevation, partially in section. Fig. 3 is a side view, in larger size, of one of the teeth as attached to the harrow. Fig. 4 is a section of the tooth on line $x\ x$ of Fig. 3.

Similar letters of reference indicate corresponding parts.

The harrow A is made in triangular form of the desired size, $a\ a$ being the side bars, and $b\ b\ b$ the cross-bars. At the forward point of the frame a plate, $c$, is attached, carrying a swiveling draft-hook, $d$. The teeth $e$ are attached to the side bars, $a$, and cross-bars $b$. The teeth $e$ consist of iron or steel plates or blades in the form of a rectangular triangle, with the longer side beveled to a knife-edge. Upon the forward and upper angle of each tooth is a lug or shoulder, $f$, from which projects a pin, $g$, that passes horizontally into or through the bars of the harrow-frame from the front, so that the teeth are kept to place when in use, and may be readily removed when desired.

The upper edges of the teeth $e$ are set in mortises to prevent any side movement, and the near edges are formed with wings $h$, that assist in leveling and pulverizing the soil. In this form the teeth act very efficiently in breaking up clods and pulverizing the soil, and as the action of the inclined cutting-edge is downward, weeds, grass, and stones which are not cut will be forced into the soil instead of being raised upward.

Upon the top of the harrow there is attached a sled, consisting of wrought-iron runners $i$, connected by braces $k$. The rear ends of the runners $i$ enter mortises in the rear cross-bar $b$ of the harrow. Their forward ends are bent to clasp around the side bars, $a$, and movement in either direction is prevented by a hook, $l$, that is hung on the harrow and engages with a lug on one of the braces $k$. On mellow soil, where the additional weight of the sled is not required, the sled may be removed by releasing the hook $l$. This sled is for use in removing the harrow to or from the field when the harrow is to be turned over, so that it rests upon the runners $i$. The swiveling draft-hook $d$ permits this to be readily done without detaching the horses.

For marking corn-land, removable opening-teeth $m$ are attached upon the rear cross-bar $b$ and side bars, $a$. When not required, these teeth are to be removed and attached on the upper side in holes provided for the purpose.

By the above-described construction the harrow is adapted for the additional work of a pulverizer and drill. It is of light draft. It is adapted for working soft or hard soils. It will not bring weeds, manure, &c., to the surface, but will cut them up and force them into the soil; and the sled is a convenient means for obtaining extra weight when required, and for transporting the harrow.

Having thus fully described my invention, I claim as new and desire to secure by Letters Patent—

In a harrow, the teeth $e$, each consisting of a plate with an inclined cutting-edge and wings $h$, and formed with a shoulder, $f$, and pin $g$, for connection with the harrow, substantially as described and shown.

ALFRED DEISHER.

Witnesses:
  KONRAD TISCHMAKER,
  ARTENIUS ORTH.